April 9, 1935. K. B. ULLMAN, JR 1,997,242
CUTTING DEVICE
Filed Sept. 27, 1933
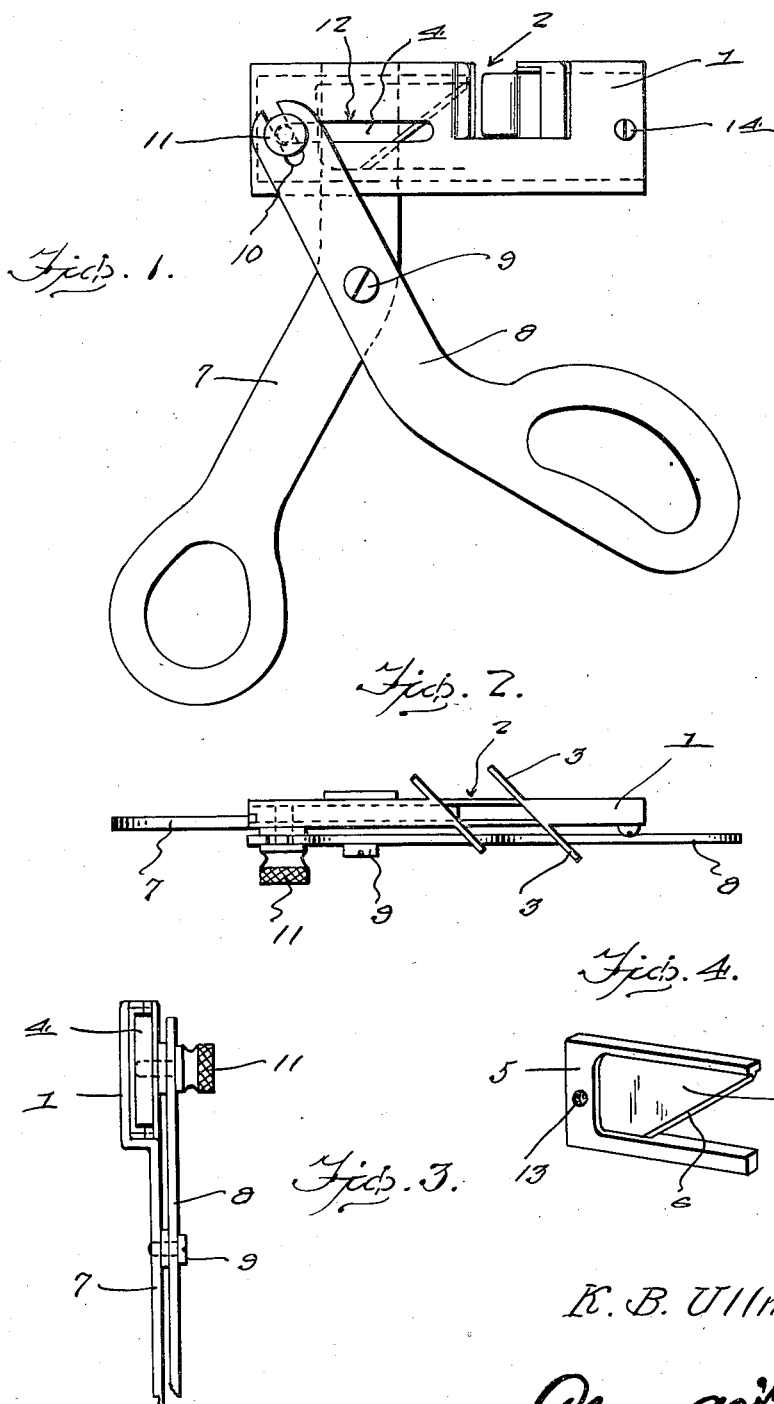
Inventor
K. B. Ullman, Jr.
By Clarence A. O'Brien
Attorney Patented Apr. 9, 1935

1,997,242

UNITED STATES PATENT OFFICE 1,997,242

CUTTING DEVICE

Karl B. Ullman, Jr., Northampton, Mass.

Application September 27, 1933, Serial No. 691,229

1 Claim. (Cl. 30—11)

This invention relates to a cutting device, the general object of the invention being to provide a casing-like member having a diagonally arranged opening therein for receiving the object to be cut, with a sliding knife in the member having a beveled cutting edge for cutting that part of the object which passes through the opening, with a draw cut, so that the object is cut at an angle to a right angle.

A further object of the invention is to provide a handle on the casing and another handle for reciprocating the blade.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation of the device.
Figure 2 is a top plan view.
Figure 3 is an end view.
Figure 4 is a view of the blade.

As shown in this drawing, the numeral 1 indicates an elongated casing-like member having its ends open and said casing is formed with an opening 2 which extends diagonally across the upper part of the member and wings 3 are formed on the member and form continuations of the diagonal ends of the opening, as clearly shown in Figure 2. A blade 4, reinforced as shown at 5, is slidably arranged in the casing with its cutting edge beveled or diagonally arranged, as shown at 6, so that the blade will make a draw cut on that part of an object passing through the opening, and as will be seen, the cut will be made at an angle to a right angle due to the position in the diagonal opening of the part of the object being cut.

A handle 7 is connected with the rear part of the casing-like member and depends therefrom and a second handle 8 is pivoted to the first handle, as shown at 9, and has a notch 10 in its upper end for receiving a part of a screw 11 which passes through a longitudinally extending slot 12 in the casing and is threaded into the rear end of the knife member which is provided with a hole 13 to receive the inner end of the screw.

Thus it will be seen that when the finger engaging ends of the handles are moved toward each other or the handle 8 is moved toward the handle 7, the blade will be caused to pass through the opening 2 and thus cut an object passing through said opening.

The casing may be formed in any suitable manner, though it is shown as composed of two parts or sections suitably connected together and a screw 14 passes through the front end of the casing, as shown.

This device is mainly intended for cutting flowers and the like where it is desirable to cut the stems with a diagonal cut and without marring of the bark or any part of the stem. As will be seen, the knife is enclosed by the casing so that there is but little, if any, danger of the operator cutting himself and by leaving the ends of the casing open there is very little danger of foreign matter clogging the casing and preventing movement of the knife and if this should happen, the casing can be readily cleaned. It will also be seen that it is simply necessary to remove the screw 11 in order to free the knife so that the knife can be removed from the casing for sharpening purposes or a new knife or blade can be substituted for the old one.

By providing the reinforcement 5 for the blade 4, the blade can be made very thin so that it will make a free slicing cut, without damage to the stem being cut, such as might result if the blade was of considerable thickness. The blade is held out of contact with any part of the casing by the reinforcement and the blade will pass through the object being cut and continue into the casing and thus cut the stem with a clean cut and without damage to other parts of the stem.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A cutting device of the class described comprising an elongated casing having a diagonal opening passing therethrough, said opening passing through an edge of the casing, wings on the casing forming continuations of the diagonal ends of the opening, a knife slidably arranged in the casing and having a beveled edge for cutting an object passing through the opening, a handle connected with the casing, a second handle pivoted to the first handle and having a notch in one end thereof, a screw threaded in a part of the knife, and the casing having a longitudinally extending slot therein for receiving the screw and a part of the screw fitting in the notch in the handle.

KARL B. ULLMAN, Jr.